United States Patent
Park

(10) Patent No.: US 10,950,189 B2
(45) Date of Patent: Mar. 16, 2021

(54) DISPLAY APPARATUS AND DRIVING METHOD THEREOF

(71) Applicant: SAMSUNG ELECTRONICS CO., LTD., Suwon-si (KR)

(72) Inventor: Jaesung Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/703,201

(22) Filed: Dec. 4, 2019

(65) Prior Publication Data

US 2020/0184905 A1 Jun. 11, 2020

(30) Foreign Application Priority Data

Dec. 5, 2018 (KR) .................. 10-2018-0155157

(51) Int. Cl.
*G09G 3/34* (2006.01)
*G09G 3/36* (2006.01)
*G06T 7/00* (2017.01)
*G05B 13/02* (2006.01)

(52) U.S. Cl.
CPC .......... *G09G 3/342* (2013.01); *G05B 13/027* (2013.01); *G06T 7/0002* (2013.01); *G09G 3/36* (2013.01); *G06T 2207/20081* (2013.01); *G06T 2207/20084* (2013.01); *G09G 2320/066* (2013.01); *G09G 2320/0646* (2013.01); *G09G 2320/0686* (2013.01)

(58) Field of Classification Search
CPC .. G09G 3/342; G09G 3/36; G09G 2320/0686; G09G 2320/066; G09G 2320/0646; G09G 2360/16; G09G 3/2014; G09G 3/3426; G06T 7/0002; G06T 2207/20084; G06T 2207/20081; G05B 13/027
See application file for complete search history.

(56) References Cited

U.S. PATENT DOCUMENTS

| 10,817,990 B1 * | 10/2020 | Yang .................. G06T 3/4046 |
| 10,825,204 B2 * | 11/2020 | Jeon .................... G06T 5/50 |
| 10,832,447 B2 * | 11/2020 | Jeon .................... H04N 19/86 |
| 2017/0162173 A1 | 6/2017 | Ninan et al. |
| 2017/0323602 A1 | 11/2017 | Krause et al. |
| 2018/0068637 A1 | 3/2018 | Ninan et al. |

(Continued)

FOREIGN PATENT DOCUMENTS

| CN | 104320881 B | 6/2017 |
| CN | 107124790 A | 9/2017 |
| KR | 10-2016-0084655 A | 7/2016 |

*Primary Examiner* — Andrew Sasinowski
(74) *Attorney, Agent, or Firm* — Sughrue Mion, PLLC

(57) ABSTRACT

A display apparatus includes: a display panel; a backlight unit including a plurality of backlight blocks; and a processor obtaining a current duty of a driving current for driving each of the plurality of backlight blocks by applying an artificial intelligence (AI) model to pixel information of an input image and driving the backlight unit based on the obtained current duty, in which the AI model is a model trained based on first luminance information included in an output image corresponding to each of a plurality of sample images and second luminance information corresponding to pixel information included in each of the plurality of sample images.

20 Claims, 12 Drawing Sheets

(56) References Cited

U.S. PATENT DOCUMENTS

| | | |
|---|---|---|
| 2018/0136518 A1 | 5/2018 | Min et al. |
| 2018/0182356 A1 | 6/2018 | Seong et al. |
| 2018/0190215 A1 | 7/2018 | Whitehead et al. |
| 2020/0035195 A1* | 1/2020 | Maeng .................. G06F 3/1446 |
| 2020/0126263 A1* | 4/2020 | Dinh ...................... G06N 3/084 |
| 2020/0134874 A1* | 4/2020 | Kim .......................... G06T 7/97 |
| 2020/0143770 A1* | 5/2020 | Tai ........................... G09G 5/10 |
| 2020/0234414 A1* | 7/2020 | Zamir ..................... G06T 5/009 |

* cited by examiner

DISPLAY APPARATUS AND DRIVING METHOD THEREOF

CROSS-REFERENCE TO RELATED APPLICATION(S)

This application is based on and claims priority under 35 U.S.C. § 119 to Korean Patent Application No. 10-2018-0155157, filed on Dec. 5, 2018, in the Korean Intellectual Property Office, the disclosure of which is incorporated by reference herein in its entirety.

BACKGROUND

Field

The disclosure relates to a display apparatus and a driving method thereof and more particularly to, a display apparatus including a backlight and a driving method thereof.

In addition, the disclosure relates to an artificial intelligence (AI) system simulating recognition and decision functions of a human brain using a machine learning algorithm, and an application thereof.

Description of the Related Art

In recent years, an artificial intelligence system implementing human-level intelligence has been used in various fields. The artificial intelligence system is a system in which a machine becomes smart by performing learning and making decision by itself unlike an existing rule-based smart system. The more the artificial intelligence system is used, the more improved recognition rate and the more accurate understanding of a user's taste. Therefore, the existing rule-based smart system has been gradually replaced by a deep learning-based artificial intelligence system.

An artificial intelligence technology consists of machine learning (for example, deep learning) and an element technology using the machine learning.

The machine learning is an algorithm technology classifying/learning feature of input data by itself. The element technology is a technology simulating recognition and decision functions of a human brain using a machine learning algorithm such as the deep learning or the like, and may consist of technical fields such as linguistic understanding, visual understanding, inference/prediction, knowledge representation, a motion control and the like.

The following are various fields to which the artificial intelligence technology is applied. The linguistic understanding is a technology to recognize and apply/process human languages/characters, and may include natural language processing, machine translation, a dialog system, question and answer, speech recognition/synthesis and the like. The visual understanding is a technology to recognize and process things simulating human vision, and may include object recognition, object tracking, image search, human recognition, scene understanding, space understanding, image improvement and the like. The inference/prediction is a technology to decide information for logical inference and prediction, and may include knowledge/probability-based inference, optimization prediction, preference-based planning, recommendation and the like. The knowledge representation is a technology to automate and process human experience information as knowledge data, and may include knowledge build (data creation/classification), knowledge management (data utilization) and the like. The motion control is a technology to control self-driving of a vehicle and a motion of a robot, and may include a motion control (navigation, collision and driving), a manipulation control (behavior control) and the like.

Meanwhile, an existing rule-based local dimming may obtain a current duty by considering only an average pixel value, a maximum pixel value, a minimum pixel value or the like of an input image without considering features of an output image, and control a backlight based thereon. Even a non self-luminous display device requires a method for outputting an image with a contrast ratio of a level of a self-luminous display device by performing local dimming in consideration of the features of the output image.

SUMMARY

Embodiments of the disclosure overcome the above disadvantages and other disadvantages not described above. Also, the disclosure is not required to overcome the disadvantages described above, and an embodiment of the disclosure may not overcome any of the problems described above.

The disclosure provides a display apparatus performing local dimming to a backlight using an artificial intelligence model, and a driving method thereof.

In accordance with an aspect of the disclosure, a display apparatus may include: a display panel; a backlight unit including a plurality of backlight blocks; and a processor configured to obtain a current duty of a driving current for driving each of the plurality of backlight blocks by applying an artificial intelligence (AI) model to pixel information of an input image and drive the backlight unit based on the obtained current duty, in which the AI model may be a model trained based on first luminance information included in an output image corresponding to each of a plurality of sample images and second luminance information corresponding to pixel information included in each of the plurality of sample images.

In accordance with an aspect of the disclosure, a driving method of a display apparatus including a backlight unit may include: obtaining a current duty of a driving current for driving each of a plurality of backlight blocks included in the backlight unit by applying an artificial intelligence (AI) model to pixel information of an input image; and driving the backlight unit based on the obtained current duty, in which the AI model may be a model trained based on first luminance information included in an output image corresponding to each of a plurality of sample images and second luminance information corresponding to pixel information included in each of the plurality of sample images.

Additional and/or other aspects and advantages of the disclosure will be set forth in part in the description which follows and, in part, will be obvious from the description, or may be learned by practice of the disclosure.

BRIEF DESCRIPTION OF THE DRAWINGS

The above and/or other aspects, features, and advantages of certain embodiments of the present disclosure will be more apparent from the following description, taken in conjunction with the accompanying drawings, in which.

DETAILED DESCRIPTION

Figure 1:
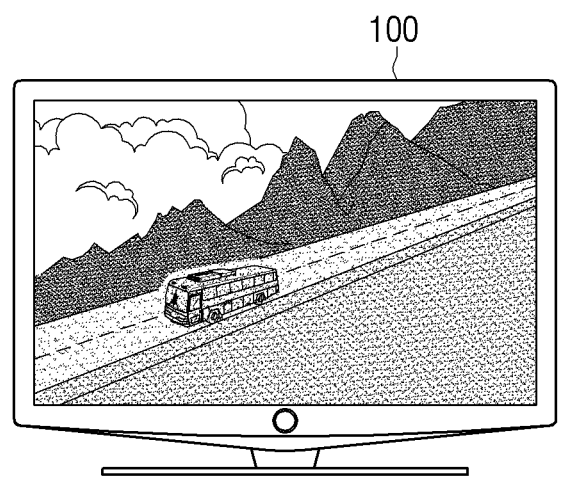
FIG. 1 is a diagram describing a feature of a display panel according to an embodiment.

Hereinafter, the disclosure is described in detail with reference to the accompanying drawings.

General terms that are currently widely used were selected as terms used in embodiments of the disclosure in consideration of functions in the disclosure, and may be changed depending on the intention of those skilled in the art or a judicial precedent, the emergence of a new technique and the like. In addition, in a specific case, terms arbitrarily chosen by an applicant may exist. In this case, the meanings of such terms are mentioned in detail in corresponding description portions of the disclosure. Therefore, the terms used in the embodiments of the disclosure need to be defined on the basis of the meanings of the terms and the contents throughout the disclosure rather than simple names of the terms.

In the disclosure, an expression 'have', 'may have', 'include', 'may include' or the like, indicates existence of a corresponding feature (for example, a numerical value, a function, an operation, a component such as a part or the like), and does not exclude existence of an additional feature.

In the specification, 'A or/and B' may indicate either 'A or B', or 'both of A and B'.

Expressions 'first', 'second' or the like, used in the disclosure may indicate various components regardless of a sequence and/or importance of the components. These expressions are used only in order to distinguish one component from the other components, and do not limit the corresponding components.

In case that any component (for example, a first component) is mentioned to be (operatively or communicatively) coupled with/to or connected to another component (for example, a second component), it is to be understood that the any component is directly coupled to the another component or may be coupled to the another component through other component (for example, a third component).

Singular forms used herein are intended to include plural forms unless explicitly indicated otherwise. It is further understood that a term 'include' or 'formed of' used in the specification specifies the presence of features, numerals, steps, operations, components, parts or combinations thereof, which is mentioned in the specification, and does not preclude the presence or addition of one or more other features, numerals, steps, operations, components, parts or combinations thereof.

In the embodiments, a 'module' or a '~er/~or' may perform at least one function or operation, and be implemented by hardware or software or be implemented by a combination of hardware and software. In addition, a plurality of 'modules' or a plurality of '~ers/~ors' may be integrated in at least one module and be implemented by at least one processor (not illustrated) except for a 'module' or a '~er/or' that needs to be implemented by a specific hardware.

In the specification, such a term as 'user' may refer to a person who uses an electronic device or a device (e.g. an artificial intelligence electronic device) which uses an electronic device.

Hereinafter, embodiments in the disclosure are described in detail with reference to the accompanying drawings.

FIG. 1 is a diagram describing a feature of a display panel according to an embodiment.

A display panel implemented using a non self-luminous element, for example, a liquid crystal display (LCD) panel, may require a display module thereof to include a backlight in order to implement an image.

The LCD panel which implements the image using the backlight may maintain an output image signal for a predetermined time to display the image. A display apparatus 100 according to an embodiment may use backlight dimming as a method for improving contrast ratio and power consumption. The backlight dimming may be classified into local dimming dividing a screen into a plurality of regions and individually controlling a light-on time of the backlight for each region and global dimming collectively controlling the light-on time of the backlight of an entire screen.

The display apparatus 100 according to an embodiment may reduce light-on time or a light amount of the backlight which corresponds to a darker portion of the image. In addition, the display apparatus 100 may increase the light-on time or the light amount of the backlight which corresponds to a brighter portion of the image. Accordingly, the display apparatus 100 may output an image with an increased contrast ratio.

Hereinafter, there are described various embodiments of performing the local dimming using artificial intelligence (AI) model performing machine learning based on basic data including a plurality of sample images.

Figure 2:
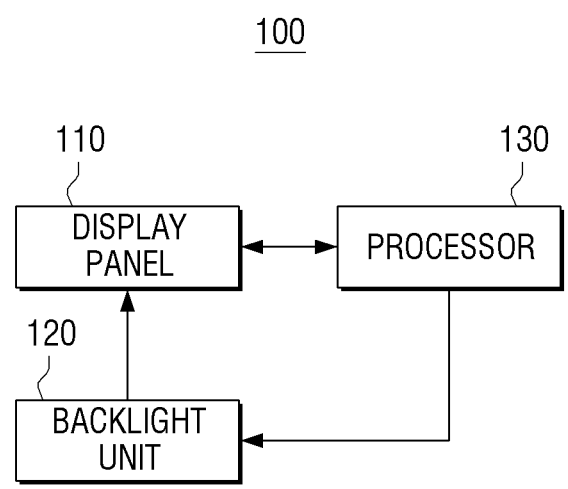
FIG. 2 is a block diagram illustrating a configuration of a display apparatus according to an embodiment.

FIG. 2 is a block diagram illustrating a configuration of a display apparatus according to an embodiment.

Referring to FIG. 2, the display apparatus 100 may include a display panel 110, a backlight unit 120 and a processor 130.

The display apparatus 100 may be implemented in a smart phone, a tablet, a smart television (TV), an Internet TV, a web TV, an internet protocol television (IPTV), signage, a personal computer (PC), a monitor and the like, and is not limited thereto. The display apparatus 100 may be implemented in various types of devices with display functions such as large format display (LFD), digital signage, digital information display (DID), a video wall, projector display, etc.

The display panel 110 may include a plurality of pixels, and each pixel may include a plurality of sub-pixels. For example, each pixel may include three sub-pixels respectively corresponding to a plurality of lights such as red, green and blue lights R, G and B. However, each pixel is not limited thereto. In some cases, each pixel may include cyan, magenta, yellow, black or other sub-pixels in addition to the red, green and blue sub-pixels. Here, the display panel 110 may be implemented as a liquid crystal panel. However, in case that the backlight dimming according to an embodiment is applicable, the display panel 110 may be implemented as another type of a display panel.

The backlight unit 120 may irradiate light to the display panel 110.

In particular, the backlight unit 120 may irradiate the light to the display panel 110 from a rear surface of the display panel 110, i.e. a surface opposite to a surface on which an image is displayed.

The backlight unit 120 may include a plurality of light sources; and the plurality of light sources may include a line light source such as a lamp, a point light source such as a light emitting diode or the like, and is not limited thereto. The backlight unit 120 may be implemented as a direct type backlight unit or an edge type backlight unit. The light source of the backlight unit 120 may be any one of light sources such as a light emitting diode (LED), a hot cathode fluorescent lamp (HCFL), a cold cathode fluorescent lamp (CCFL), an external electrode fluorescent lamp (EEFL), an electroluminescent panel (ELP) and an flat fluorescent lamp (FFL), or two or more of the light sources.

According to an embodiment, the backlight unit 120 may be implemented as a plurality of backlight blocks, a plurality of LED modules and/or a plurality of LED cabinets. In addition, each of the backlight blocks may include a plurality of LED pixels. According to an embodiment, the LED pixels may be each implemented as a blue LED or a white LED, and are not limited thereto. The LED pixels may also be implemented to include at least one of red LED, greed LED or blue LED.

The processor 130 may control an overall operation of the display apparatus 100.

According to an embodiment, the processor 130 may be implemented as a digital signal processor (DSP), a microprocessor or a time controller (TCON). However, the processor 130 is not limited thereto. The processor 130 may include one or more of a central processing unit (CPU), a micro controller unit (MCU), a micro processing unit (MPU), a controller, an application processor (AP), a graphics-processing unit (GPU), a communication processor (CP) and an ARM processor, or may be defined by these terms. In addition, the processor 130 may be implemented in a system-on-chip (SoC) or a large scale integration (LSI), in which a processing algorithm is embedded, or may be implemented in a field programmable gate array (FPGA) form. The processor 130 may perform various functions by executing computer executable instructions stored in a memory.

The processor 130 may drive the backlight unit 120 to provide the light to the display panel 110. In detail, the processor 130 may adjust and output at least one of supply time or intensity of a driving current (or driving voltage) supplied to the backlight unit 120.

In detail, the processor 130 may control luminance of the light sources included in the backlight unit 120 using a pulse width modulation (PWM) in which a duty ratio is variable, or changing the intensity of the current. Here, a pulse width modulation (PWM) signal may control light-on and -off ratios of the light sources, and the duty ratio (%) may be determined based on a dimming value input from the processor 130.

In this case, the processor 130 may be implemented to include a driver integrated circuit (IC) for driving the backlight unit 120. For example, the processor 130 may be implemented as a digital signal processor (DSP), and may be implemented in one chip with a digital driver IC. However, the driver IC may be implemented as hardware separate from the processor 130. For example, in case that the light sources included in the backlight unit 120 are implemented as LED elements, the driver IC may be implemented as at least one LED driver which controls a current applied to the LED elements. According to an embodiment, the LED driver may be disposed behind a power supply (e.g. switching mode power supply (SMPS)) to receive a voltage from the power supply. However, according to an embodiment, the voltage may be applied from a separate power supply device. Alternatively, the driver IC may also be implemented in a form of a single module in which the SMPS and LED drivers are integrated with each other.

The processor 130 may obtain a dimming ratio for driving the backlight unit 120, i.e. a light-on duty of the current (hereinafter, a current duty). The processor 130 may respectively drive a plurality of backlight blocks included in the backlight unit 120 with current duties different from each other. Accordingly, the display apparatus 100 may implement the local dimming and improve the contrast ratio.

The processor 130 according to an embodiment may obtain the current duty for driving the backlight unit 120 by applying the AI model to pixel information of an input image. Here, the AI model may be a model performing machine learning based on basic data including a plurality of sample images. For example, the AI model may be a model trained by a convolutional neural network (CNN) based on a plurality of sample images. Here, the CNN may refer to a multi-layered neural network having a special connection configuration designed for speech processing, image processing, etc. In particular, the CNN may filter an image in various ways by preprocessing the pixels and recognize features of the image. Meanwhile, the AI model may not be limited to the CNN. For example, the display apparatus 100 may use the AI model based on various neural networks such as recurrent neural network (RNN), deep neural network (DNN) and the like.

The pixel information (or pixel physical quantity) of the input image according to an embodiment may be at least one of the following pixel values of the input image: a pixel-by-pixel value, an average pixel value, a maximum pixel value (or peak pixel value), a minimum pixel value, an intermediate pixel value or an average picture level (APL). Alternatively, the pixel information may be at least one of the following pixel values of each image block region included in the input image: an average pixel value, a maximum pixel value (or peak pixel value), a minimum pixel value, an intermediate pixel value or an APL. In this case, the pixel value may include at least one of a luminance value (or gradation value) or a color coordinate value. Hereinafter, for convenience of description, there is described a case in which the pixel-by-pixel value of the input image is used as the pixel information.

Figure 3A:
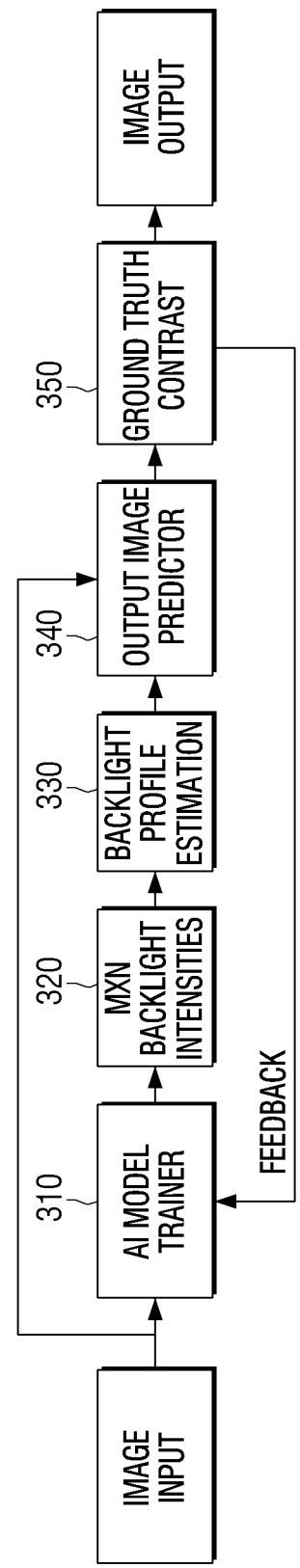
FIGS. 3A and 3B are diagrams describing a local dimming method according to an embodiment.
Figure 3B:
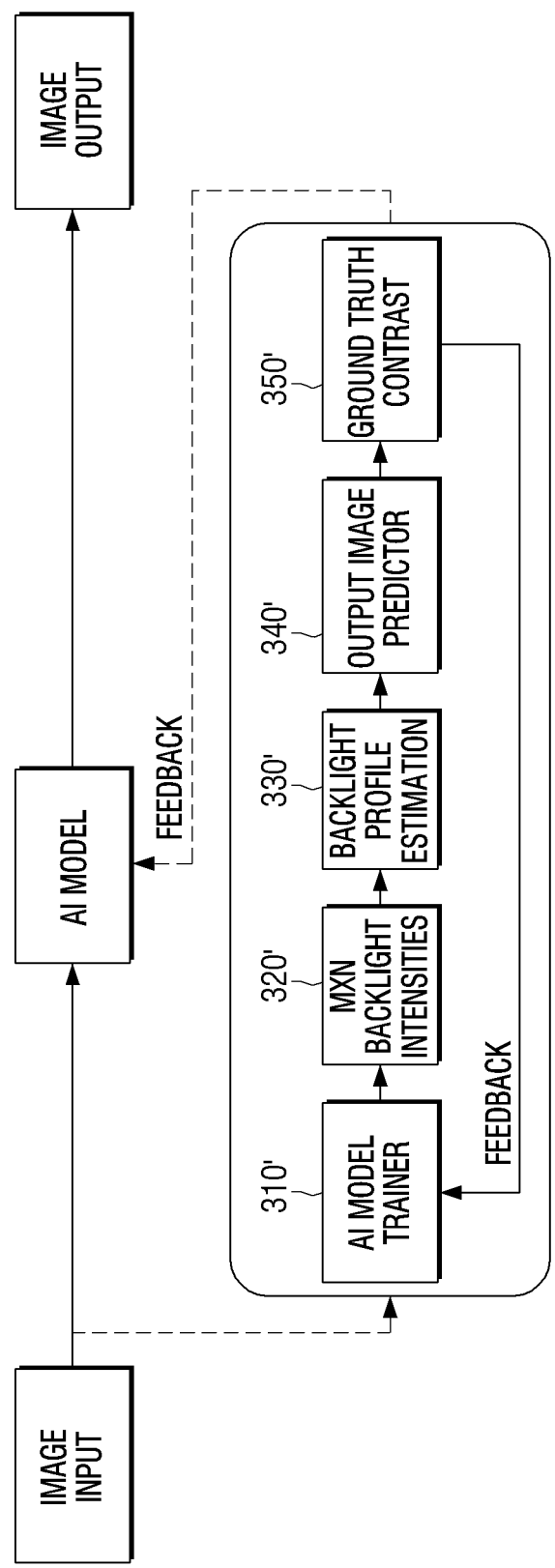

FIGS. 3A and 3B are diagrams describing a local dimming method according to an embodiment.

Referring to FIG. 3A, the processor 130 may obtain a current duty of a driving current for driving each of the plurality of backlight blocks by applying an artificial intelligence (AI) model trainer 310 to the pixel information of the input image.

The processor 130 according to an embodiment may obtain the current duty of the driving current for driving each of the plurality of backlight blocks to output the image by applying backlight local dimming to the input image. For example, it may be assumed that the backlight unit 120 includes a plurality of backlight blocks arranged in an M×N form. The processor 130 may obtain M×N number of current duties for individually driving each of the plurality of backlight blocks arranged in the M×N form.

The processor 130 according to an embodiment may obtain luminance information and color information from the input image, and may obtain the dimming ratio for driving each of the plurality of backlight blocks, i.e. the current duty by applying the AI model trainer 310 to the luminance information. In addition, the processor 130 may transmit the obtained color information to an output image predictor 340 as described below. The AI model according to an embodiment may be either a deep neural network (DNN) model obtaining a representative output value of each of the plurality of backlight blocks using dimensionality reduction on the input image or a combination of a plurality of DNN models. For example, the input image may include high dimensional input information, and the AI model may obtain the representative output value corresponding to each block by using the dimension reduction on the input image. Here, the representative output value may refer to the dimming ratio for driving the block, i.e. the current duty.

Here, the dimension reduction may refer to feature selection, feature extraction, etc. For example, the feature selection may be performed in a manner that the processor 130 selects a region-specific feature of each block on the high dimensional input image, and applies the input data based on the selected feature to the AI model. The processor 130 may then obtain the representative output value for each block.

For another example, the feature may be performed in a manner that the processor 130 extracts the region-specific feature of each block on the high dimensional input image, and applies the AI model using an extracted feature as the input data. The processor 130 may then obtain the representative output value for each block.

Meanwhile, the above-described AI model may be the AI model based on various algorithms according to an embodiment.

Referring to FIGS. 3A and 3B, in an embodiment, a current duty corresponding to each of the plurality of backlight blocks, which is obtained by the processor 130 based on the AI model trainer 310, may be referred to as M×N backlight intensities 320, a hypothesis, a predicted value or the like, and for convenience of description, may be hereinafter collectively referred to as the current duty.

The processor 130 according to an embodiment may drive the plurality of backlight blocks to correspond to the current duty (or, the M×N backlight intensities 320) through a backlight profile estimation 330. The above is described in detail with reference to FIG. 4.

Figure 4:
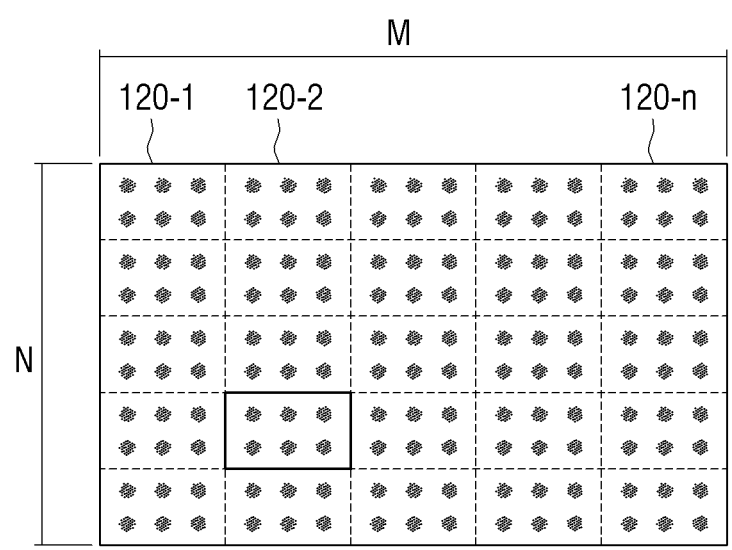
FIG. 4 is a diagram describing a method of obtaining a current duty corresponding to each of backlight blocks according to an embodiment.

FIG. 4 is a diagram describing a method of obtaining a current duty corresponding to each of backlight blocks according to an embodiment.

The processor 130 may drive the backlight unit 120 using the local dimming which identifies the screen as a plurality of regions and individually controls the backlight for each region.

The processor 130 may identify the screen as a plurality of screen regions separately controlled depending on an implementation form of the backlight unit 120. The processor 130 may then apply the AI model trainer 310 to pixel information of an image (hereinafter, an image region) which is to be displayed on each screen region to obtain a current duty for driving each of the light sources of the backlight unit 120 corresponding to each image region. Here, backlight regions corresponding to the plurality of image regions may refer to the backlight blocks, respectively. Referring to FIG. 4, the backlight unit 120 may include a plurality of backlight blocks 120-1, 120-2 . . . and 120-n, which are arranged in the M×N form; and each of the backlight blocks may include at least one light source, for example, a plurality of light sources.

The processor 130 may then drive the plurality of backlight blocks 120-1, 120-2 . . . and 120-n with current duties different from each other, respectively.

Meanwhile, the backlight unit 120 illustrated in FIG. 4 may be an embodiment, and the plurality of backlight blocks included in the backlight unit 120 may have a variety of sizes, numbers and arrangement form.

According to an embodiment, the backlight unit 120 may be implemented as a direct type backlight unit as illustrated in FIG. 4. For example, the direct type backlight unit may be implemented in a configuration in which a plurality of optical sheets and a diffusion plate are stacked below the display panel 110 and a plurality of light sources are arranged below the diffusion plate.

The direct type backlight unit may be divided into the plurality of backlight blocks 120-1, 120-2 . . . and 120-n based on an arrangement configuration of the plurality of light sources, as illustrated in FIG. 4. In this case, each of the plurality of backlight blocks 120-1, 120-2 . . . and 120-n may be driven by the current duty obtained by applying the AI model trainer 310 to pixel information of a corresponding screen region, as illustrated in FIG. 4.

According to an embodiment, the backlight unit 120 may be implemented as an edge type backlight unit. For example, the edge type backlight unit may be implemented in a configuration in which a plurality of optical sheets and a light guide plate are stacked below the display panel 110 and a plurality of light sources are arranged on sides of the light guide plate. The edge type backlight unit may be divided into the plurality of backlight blocks based on an arrangement configuration of the plurality of light sources.

Referring to FIG. 3A again, the processor 130 according to an embodiment may obtain an image to be output based on a light profile of a light source included in each of the plurality of backlight blocks through the backlight profile estimation 330 and the output image predictor 340.

The processor 130 according to an embodiment may predict at least one of diffuser information or transmission information of light irradiated from the light source included in the backlight block to the display panel 110 based on the light profile through the backlight profile estimation 330, and may obtain luminance information of the output image based on predicted information. Hereinafter, for convenience of description, luminance information included in the output image output by driving the backlight unit 120 is collectively referred to as the luminance information of the output image.

The processor 130 according to an embodiment may obtain the output image based on color information obtained from the input image through the output image predictor 340 and the luminance information of the output image obtained through the backlight profile estimation 330. Meanwhile, the above is an embodiment, and is not necessarily limited hereto.

Figure 5:
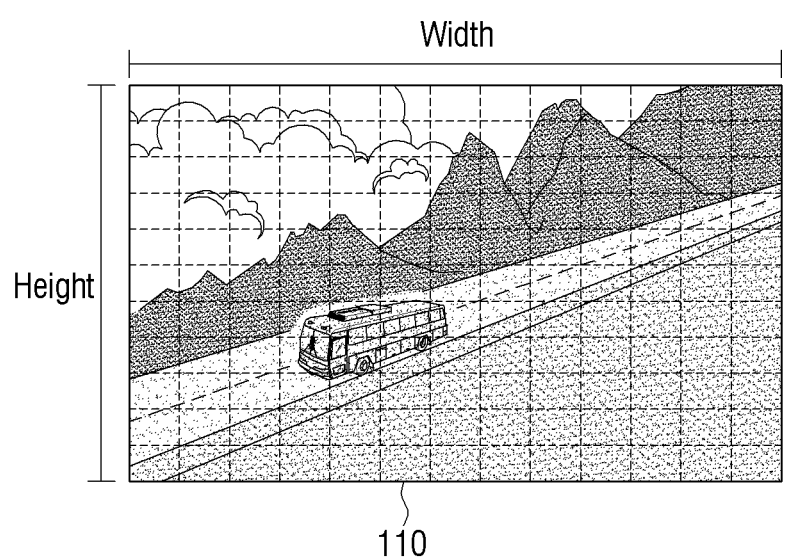
FIG. 5 is a diagram describing an output image according to an embodiment.

FIG. 5 is a diagram describing an output image according to an embodiment.

Referring to FIG. 5, the backlight unit 120 according to an embodiment may include a plurality of backlight blocks 120-1, 120-2 . . . and 120-n, which are arranged in 13×11 form; and each of the backlight blocks may include at least one light source.

Light emitted by the light source included in each of the plurality of backlight blocks 120-1, 120-2 . . . and 120-n may reach the display panel 110 through diffusion, transmission or the like.

The processor 130 according to an embodiment may predict at least one of light diffusion information or light transmission information based on the light profile of each light source included in each of the backlight blocks. The processor 130 may then obtain an output image corresponding to a resolution (width×height) of the display panel 110 based on the current duty and the predicted information. In addition, the processor 130 may obtain the luminance information of the output image.

Referring to FIG. 3A again, the processor 130 according to an embodiment may obtain the luminance information based on the pixel information of the input image. For example, the processor 130 may obtain a luminance value corresponding to the pixel-by-pixel value (or gray value) of the input image.

The luminance information of the output image may be affected by the number, size and arrangement form of the backlight blocks included in the backlight unit 120. Whereas, the luminance information of the input image may represent features of the input image itself independent from the number, size and arrangement form of the backlight blocks. The luminance information of the input image may be referred to as ground truth (GT), actual value or the like, and for convenience of description, may be hereinafter collectively referred to as the luminance information of the input image.

The processor 130 according to an embodiment may update the AI model trainer 310 based on the luminance information of the output image and the luminance information of the input image. In detail, the processor 130 according to an embodiment may obtain a difference value between the luminance information of the output image and the luminance information of the input image through a ground truth contrast 350. Here, the difference value may refer to a difference between the luminance values in units of nits or candelas ($Cd/m^2$). However, the above is an embodiment, and the processor 130 may also identify a difference between the features of the output image and the features of the input image. For example, the processor 130 may also obtain a difference value between a contrast ratio of the output image and a contrast ratio of the input image, etc. Here, the difference value obtained by the processor 130 may be provided to the AI model trainer 310 as described below, and may be used as a feedback for updating the AI model trainer 310.

The processor 130 may then update the AI model trainer 310 based on the difference value. For example, in case that the obtained difference value exceeds a threshold value, the processor 130 may determine that the AI model is either over-fitted or under-fitted. The processor 130 may update the AI model based on the obtained difference value. In case of receiving a new input image, the processor 130 may obtain the current duty by applying the updated AI model trainer 310' to pixel information of the received new input image.

The processor 130 according to an embodiment may obtain a current duty corresponding to the pixel information based on none of a predetermined function (or arithmetic algorithm), a lookup table or a graph form. The processor 130 may obtain the current duty corresponding to the pixel information of the input image using the AI model trainer 310 performing the machine learning based on the plurality of sample images. In addition, the processor 130 may update the AI model trainer 310 based on the luminance information of the output image and the luminance information of the input image.

In case of receiving a new input image, the processor 130 according to an embodiment may obtain the current duty of the driving current for driving each of the plurality of backlight blocks 120-1, 120-2 . . . and 120-n by applying the updated AI model trainer 310' to pixel information of the received new input image. The processor 130 may then drive the backlight blocks 120-1, 120-2 . . . and 120-n based on the obtained current duty to apply the local dimming to the new input image and output the image.

Meanwhile, FIG. 3A illustrates that the AI model trainer 310, the M×N backlight intensities 320, the backlight profile estimation 330, the output image predictor 340 and the ground truth contrast 350 are implemented as separate hardware elements. However, the above is an embodiment, and each operation may be performed by the processor 130. Meanwhile, FIG. 3A illustrates that the AI model performs learning by itself in the display apparatus 100. However, the above is an embodiment, and may not be limited hereto.

FIG. 3B is a diagram describing a local dimming method according to an embodiment.

Referring to FIG. 3B, a server may include the AI model trainer 310', M×N backlight intensities 320', a backlight profile estimation 330', an output image predictor 340' and a ground truth contrast 350'. For example, the server may obtain the current duty of the driving current for driving each of the plurality of backlight blocks included in the display apparatus 100 based on the input image through the M×N backlight intensities 320'. The server may then predict an output image corresponding to the input image through the backlight profile estimation 330' and the output image predictor 340'. The server may then obtain a difference value between the luminance information of the input image and the luminance information of the output image.

The server according to an embodiment may provide the obtained difference value to the AI model included in the display apparatus 100, and the display apparatus 100 may update the AI model based on the difference value received from the server. Here, the difference value may be referred to as a feedback or the like.

Figure 6:
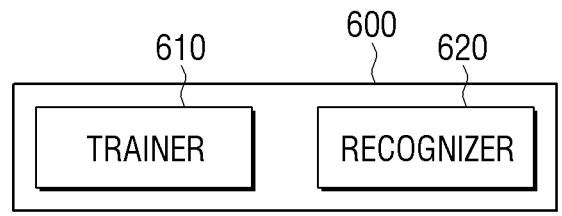
FIG. 6 is a block diagram describing an artificial intelligence model according to an embodiment.

FIG. 6 is a block diagram describing an artificial intelligence model according to an embodiment.

Referring to FIG. 6, a processor 600 may include at least one of a trainer 610 or a recognizer 620. The processor 600 in FIG. 6 may correspond to the processor 130 of the display apparatus 100 in FIG. 2 or a processor of a data training server (not illustrated).

The trainer 610 may generate or train an AI model having a criterion for obtaining the current duty of the driving current for driving the backlight unit 120 corresponding to the input image using training data. The trainer 610 may generate the AI model having the criterion using collected training data.

For example, the trainer 610 may learn to obtain the current duty of the driving current for driving the backlight unit 120 which corresponds to each of the plurality of sample images using as the training data, first luminance information included in an output image corresponding to each of the plurality of sample images and second luminance information corresponding to pixel information included in each of the plurality of sample images.

Here, the output image corresponding to the sample image may be an image obtained by applying backlight local dimming to the sample image. For example, the processor 130 may obtain the output image to which the backlight local dimming is applied by applying the initial AI model to each of the plurality of sample images. Here, an initial AI model may refer to an AI model before renewed or updated according to various embodiments.

As an embodiment of the initial AI model, the processor 130 may obtain pixel information of each region of the sample image corresponding to each of the backlight blocks of the backlight unit 120, for example, average picture level (APL) information. The processor 130 may then calculate a current duty of the backlight block corresponding to the image region based on the obtained pixel information. In another example, the processor 130 may obtain a maximum (or minimum) pixel value of each region of the sample image corresponding to each of the backlight blocks of the backlight unit 120. The processor 130 may then calculate the current duty of the backlight block corresponding to the image region based on the obtained pixel value. Meanwhile, the sample image may be at least one of a full image or a block unit image. For example, the sample image may be a full image corresponding to a resolution of the display panel 110. In another example, the sample image may be a block unit image corresponding to any one of the plurality of backlight blocks 120-1, 120-2 . . . and 120-*n*.

The processor 130 may then obtain an image to be output by applying the backlight local dimming to the sample image based on the calculated current duty. Hereinafter, for convenience of description, the image to be output is referred to as the output image.

The trainer 610 may learn to obtain the current duty of the backlight unit 120 corresponding to the sample image using as training data, a difference value between the first luminance information included in the output image corresponding to the sample image and the second luminance information corresponding to the pixel information included in the sample image. The trainer 610 may learn to reduce the difference value between the first luminance information and the second luminance information as the current duty of the backlight unit 120 changes.

In addition, the trainer 610 may generate, train or update the AI model for obtaining the current duty of the driving current for driving each of the plurality of backlight blocks 120-1, 120-2 . . . and 120-*n*, which are included in the backlight unit 120, using as the training data, the luminance information of the sample image and the luminance information of the output image corresponding to the sample image.

The recognizer 620 may obtain the current duty of the driving current for driving each of the backlight blocks 120-1, 120-2 . . . and 120-*n* each corresponding to pixel information of the input image by using predetermined data as input data of the learned AI model.

For example, the recognizer 620 may obtain (or, estimate or infer) the current duty of the driving current for driving each of the plurality of backlight blocks 120-1, 120-2 . . . and 120-*n* using the pixel information of the input image as input data of the learned AI model.

In an embodiment, the trainer 610 and the recognizer 620 may be included in an external server (not illustrated). However, such a configuration may only be an embodiment, and the trainer 610 and the recognizer 620 may be mounted in the display apparatus 100. In detail, at least a part of the trainer 610 and at least a part of the recognizer 620 may each be implemented in a software module or manufactured in a form of at least one hardware chip to be mounted in the display apparatus 100. For example, at least one of the trainer 610 or the recognizer 620 may be manufactured in the form of a dedicated hardware chip for the artificial intelligence (AI). Alternatively, at least the one of the trainer 610 or the recognizer 620 may be manufactured as a portion of an existing general-purpose processor (e.g. a central processing unit (CPU) or an application processor) or a graphics dedicated processor (e.g. a graphics processing unit (GPU)) to be mounted in the above-mentioned various electronic devices. In this case, the dedicated hardware chip for the AI may be a dedicated processor specialized in probability calculation. Therefore, the chip may have higher parallel processing performance than the existing general-purpose processor, enabling faster processing of artificial intelligence tasks such as the machine learning. In case that the trainer 610 and the recognizer 620 are implemented in a software module (or a program module including instructions), the software module may be stored in a non-transitory computer readable media which may be read by a computer. In this case, the software module may be provided by an operating system (OS) or by a predetermined application. Alternatively, a part of the software module may be provided by the operating system (OS), and the other parts may be provided by the predetermined application.

In this case, the trainer 610 and the recognizer 620 may be mounted in a single electronic device or may be mounted in separate electronic devices, respectively. For example, one of the trainer 610 and the recognizer 620 may be included in the display apparatus 100, and the other may be included in the external server. In addition, the trainer 610 and the recognizer 620 may be connected to each other by wire or wirelessly. Model information built by the trainer 610 may thereby be provided to the recognizer 620, or data input to the trainer 610 may be provided to the trainer 610 as additional training data.

Figure 7A:
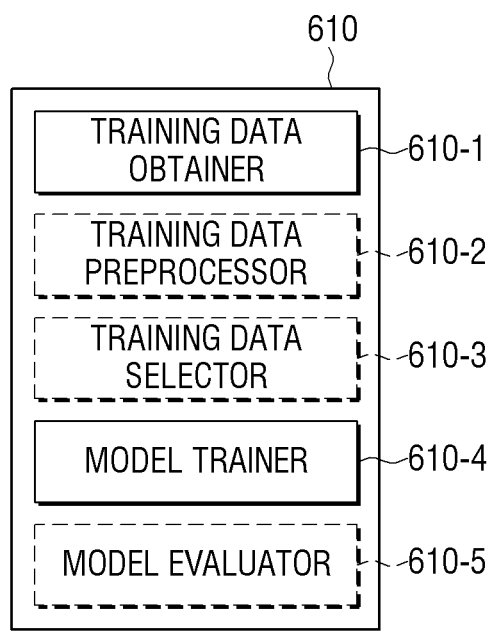
FIGS. 7A, 7B, and 8 are block diagrams illustrating detailed configurations of a trainer and a recognizer according to an embodiment.
Figure 7B:
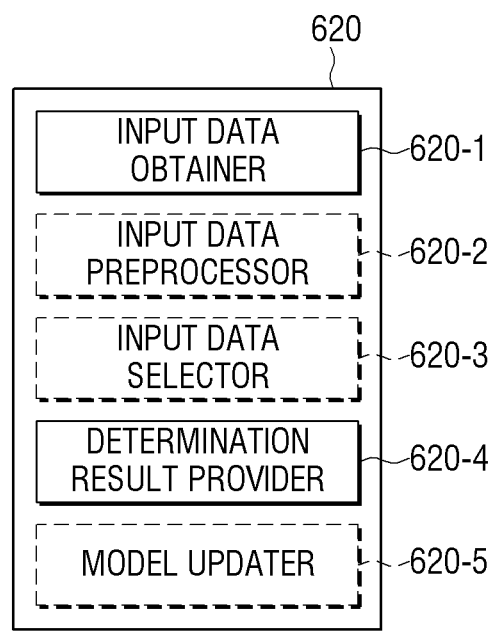
Figure 8:
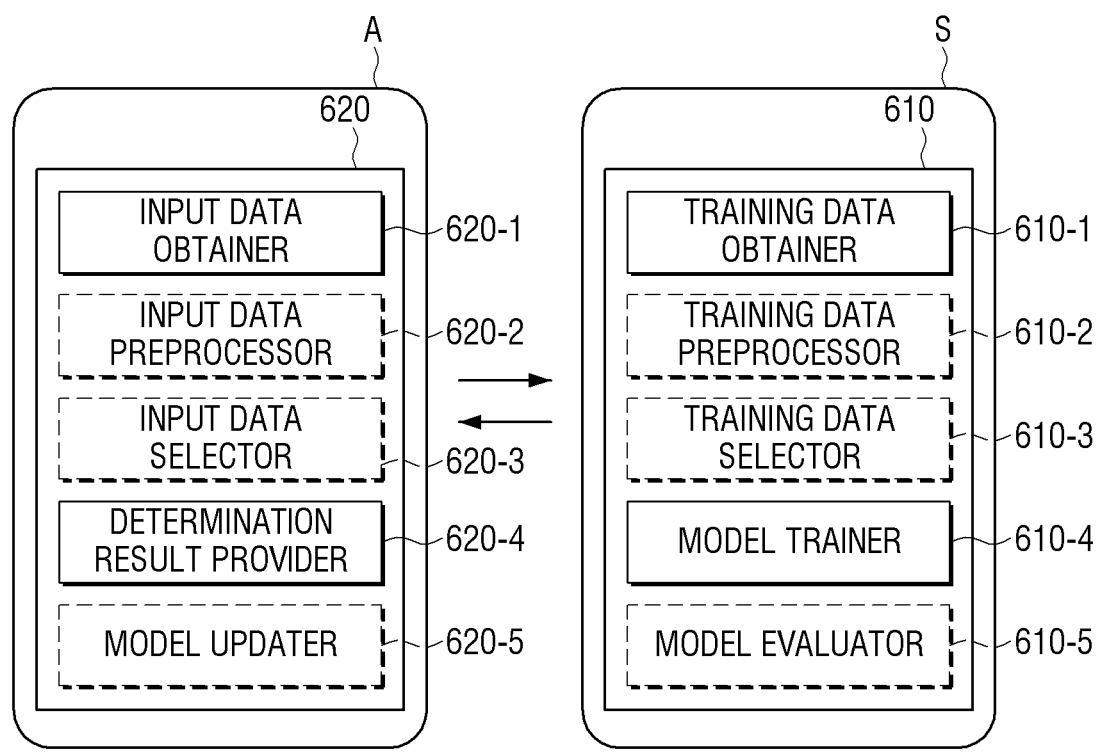

FIGS. 7A, 7B, and 8 are block diagrams illustrating detailed configurations of a trainer and a recognizer according to an embodiment.

Referring to FIG. 7A, the trainer 610 according to an embodiment may include a training data obtainer 610-1 and a model trainer 610-4. In addition, the trainer 610 may further selectively include at least one of a training data preprocessor 610-2, a training data selector 610-3 or a model evaluator 610-5.

The training data obtainer 610-1 may obtain training data necessary for the AI model for obtaining the current duty of the backlight unit 120 corresponding to the input image. According to an embodiment, the training data obtainer 610-1 may obtain as the training data, a difference value between the luminance information of the sample image and the luminance information of the output image corresponding to the sample image. Here, the luminance information of the sample image may refer to a feature of the sample image itself. The luminance information of the sample image may be referred to as a ground truth (GT), an actual value or the like, and for convenience of description, may be hereinafter collectively referred to as the luminance information of the sample image. Meanwhile, the luminance information of the sample image according to an embodiment may be luminance information obtained by applying a reference current value to the pixel information included in the sample image.

In addition, to obtain the current duty of the backlight unit 120 corresponding to the input image, the training data obtainer 610-1 may obtain as the training data, pixel information of the input image, a light profile of each light source included in the backlight unit 120, a luminance change of the output image depending on the current duty, etc. The training data may be data collected or tested by the trainer 610 or a manufacturer of the trainer 610.

The model trainer 610-4 may train the AI model to have a criterion for obtaining the current duty of the backlight unit 120 using the training data. For example, the model trainer 610-4 may train the AI model through supervised learning which uses at least some of the training data as the criterion for obtaining the current duty of the backlight unit 120. Alternatively, the model trainer 610-4 may train the AI model for itself using, for example, the training data without any supervision. That is, the model trainer 610-4 may train the AI model through unsupervised learning which finds the criterion for obtaining the current duty of the backlight unit 120. In addition, the model trainer 610-4 may train the AI model through, for example, reinforcement learning which uses a feedback on whether a determination result based on the learning is correct. In addition, the model trainer 610-4 may train the AI model using, for example, a learning algorithm which includes error back-propagation or gradient descent.

In addition, the model trainer 610-4 may learn a selection criterion on which training data needs to be used to obtain the current duty of the backlight unit 120 corresponding to the input image.

In case that there are a plurality of pre-built AI models, the model trainer 610-4 may determine as an AI model to learn, an AI model having a great correlation between the input training data and basic training data. In this case, the basic training data may be previously classified based on types of data, and the AI model may be pre-built for each type of data. For example, the basic training data may be previously classified based on various criteria such as a region where the training data is generated, time at which the training data is generated, a size of the training data, a genre of the training data, a generator of the training data and types of objects in the training data.

Once the AI model is trained, the model trainer 610-4 may store a learned AI model. In this case, the model trainer 610-4 may store the learned AI model in a memory of the external server. Alternatively, the model trainer 610-4 may store the learned AI model in a memory of a server or an electronic device, which is connected to the external server through a wired or wireless network.

The trainer 610 may further include the training data preprocessor 610-2 and the training data selector 610-3 to improve the determination result of the AI model or to save resources or time necessary for generating the AI model.

The training data preprocessor 610-2 may preprocess the obtained data, and thus the obtained data may be used for training the AI for obtaining the current duty of the backlight unit 120. The training data preprocessor 610-2 may process the obtained data into a predetermined format. The model trainer 610-4 may thus use the obtained data for obtaining the current duty of the backlight unit 120. For example, the training data preprocessor 610-2 may remove unnecessary information from input information in a situation where the AI model provides a response.

The training data selector 610-3 may select data necessary for training the AI from data obtained by the training data obtainer 610-1 or data preprocessed by the training data preprocessor 610-2. The selected training data may be provided to the model trainer 610-4. The training data selector 610-3 may select the training data necessary for training the AI from the obtained or preprocessed data based on a predetermined selection criterion. In addition, the training data selector 610-3 may select the training data based on a selection criterion predetermined based on the training performed by the model trainer 610-4.

The trainer 610 may further include a model evaluator 610-5 to improve the determination result of the AI model.

The model evaluator 610-5 may allow the model trainer 610-4 to train the AI model again in case that evaluation data is input to the AI model, and the determination result output from the evaluation data fails to satisfy a predetermined criterion. In this case, the evaluation data may be predefined data for evaluating the AI model.

For example, it may be assumed that among the determination results of the learned AI model for the evaluation data, the determination result is not accurate because the number or ratio of the evaluation data exceeds a predetermined threshold. In this case, the model evaluator 610-5 may evaluate that the determination result of the learned AI model fails to satisfy the predetermined criterion.

Meanwhile, in case that there are a plurality of learned AI models, the model evaluator 610-5 may evaluate whether each learned AI model satisfies the predetermined criterion, and may determine a model satisfying the predetermined criterion as a final AI model. Here, in case that there are a plurality of models which satisfy the predetermined criterion, the model evaluator 610-5 may determine as the final AI model, any one or a predetermined number of models predetermined in the order of the highest evaluation score.

Referring to FIG. 7B, the recognizer 620 according to an embodiment may include an input data obtainer 620-1 and a determination result provider 620-4.

In addition, the recognizer 620 may further selectively include at least one of an input data preprocessor 620-2, an input data selector 620-3 or a model updater 620-5.

The input data obtainer 620-1 may obtain data necessary for obtaining the current duty of the backlight unit 120. The determination result provider 620-4 may obtain the current duty of the backlight unit 120 by applying an input value based on the input data obtained from the input data obtainer 620-1 to the learned AI model. The determination result provider 620-4 may obtain the determination result by applying to the AI model, an input value based on data selected by one of the input data preprocessor 620-2 and the input data selector 620-3, which are described below.

In an embodiment, the determination result provider 620-4 may obtain the current duty of the backlight unit 120 corresponding to the input image by applying pixel information of an input image obtained from the input data obtainer 620-1 to the learned AI model.

The recognizer 620 may further include the input data preprocessor 620-2 or the input data selector 620-3 to improve the determination result of the AI model or to save resources or time necessary for providing the determination result.

The input data preprocessor 620-2 may preprocess obtained data, and thereby the obtained data may be used for obtaining the current duty of the backlight unit 120. The input data preprocessor 620-2 may process the obtained data into a predetermined format, and thereby the determination result provider 620-4 may use the obtained data to obtain the current duty of the backlight unit 120.

The input data selector 620-3 may select data necessary for providing a response from data obtained by the input data obtainer 620-1 or data preprocessed by the input data preprocessor 620-2. The selected data may be provided to the determination result provider 620-4. The input data selector 620-3 may select some or all of the obtained data or the preprocessed data based on a predetermined selection criterion for providing a response. In addition, the input data selector 620-3 may select data based on a selection criterion predetermined based on the training performed by the model trainer 610-4.

The model updater 620-5 may control the AI model to be updated based on an evaluation of the determination result provided by the determination result provider 620-4. For example, the model updater 620-5 may request that the model trainer 610-4 further train or update the AI model by providing the model trainer 610-4 with the determination result provided by the determination result provider 620-4.

In particular, the model updater 620-5 may retrain the AI model based on feedback information depending on a user input.

The processor 600 according to an embodiment may obtain third luminance information included in an output image output as the backlight unit 120 is driven based on a current duty corresponding to the input image. In addition, the processor 600 may obtain fourth luminance information corresponding to pixel information included in the input image. The processor 600 may then control the AI model to be renewed, additionally trained or updated based on the third luminance information of the output image and the fourth luminance information of the input image. For example, the processor 600 may control the AI model to be updated based on a difference value between the third luminance information of the output image and the fourth luminance information of the input image. In detail, the processor 600 may update the AI model to reduce the difference value.

FIG. 8 is a diagram illustrating an example in which according to an embodiment, the display apparatus 100 and an external server S are linked to each other, thereby learning and determining data.

Referring to FIG. 8, the external server S may learn a criterion for obtaining the current duty of the backlight unit 120. Based on a learning result provided by the server S, the display apparatus 100 may drive the backlight unit 120 based on the current duty corresponding to the input image and provide the output image by applying the local dimming to the input image.

In this case, the model trainer 610-4 of the server S may perform a function of the trainer 610 illustrated in FIG. 6. That is, in order to obtain the current duty of the backlight unit 120, the model trainer 610-4 of the server S may learn a criterion on how to obtain the current duty of the backlight unit 120 corresponding to the new input image using the pixel information of the input image, the luminance information of the input image and the luminance information of the output image corresponding to the input image. In addition, the determination result provider 620-4 of the display apparatus 100 may obtain the current duty of the backlight unit 120 by applying data selected by the input data selector 620-3 to the AI model generated by the server S. Alternatively, the determination result provider 620-4 of the display apparatus 100 may receive the AI model generated by a server 50 from the server 50, and may obtain the current duty of the backlight unit 120 using the received AI model.

Figure 9:
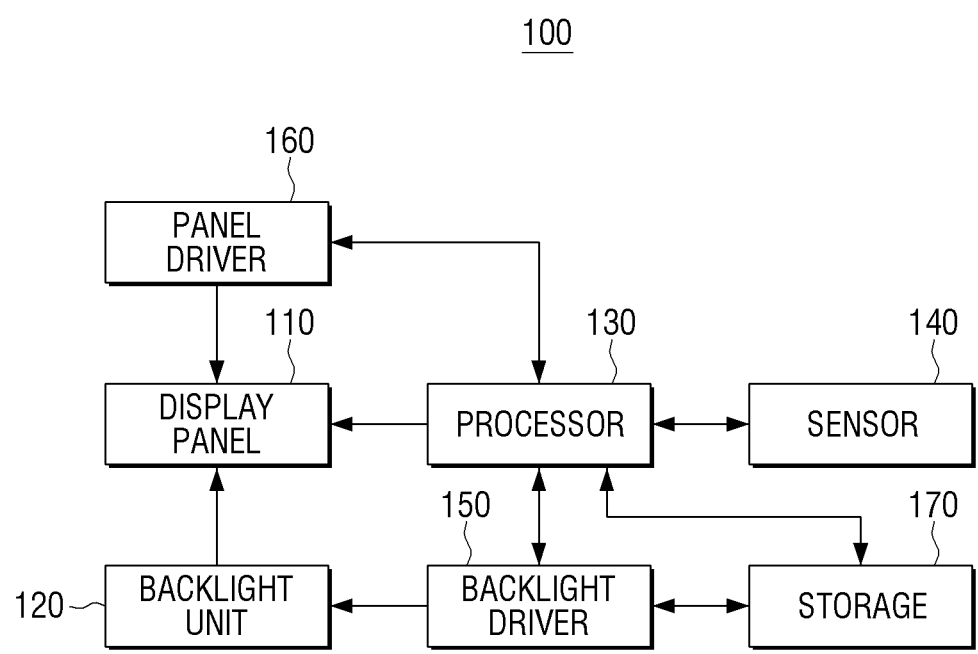
FIGS. 9 and 10 are diagrams describing a detailed configuration of a display apparatus according to an embodiment.
Figure 10:
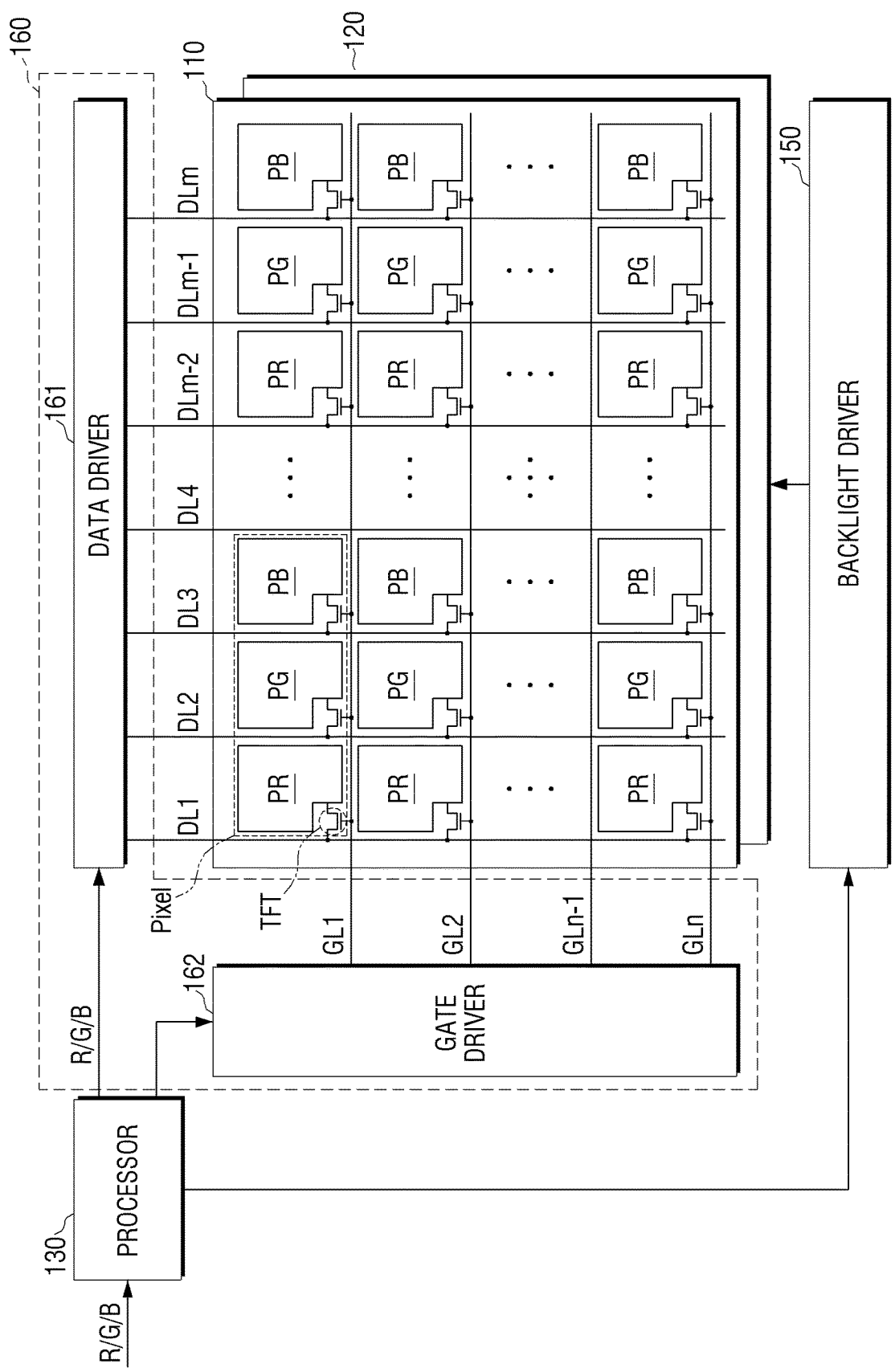

FIG. 9 and FIG. 10 are diagrams describing a detailed configuration of a display apparatus according to an embodiment.

Referring to FIG. 9, the display apparatus 100 may include the display panel 110, the backlight unit 120, the processor 130, a sensor 140, a backlight driver 150, a panel driver 160 and a storage 170. Omitted is a detailed description for components illustrated in FIG. 9 overlapped with components illustrated in FIG. 2A among the components illustrated in FIG. 9.

The sensor 140 may detect external light.

In detail, the sensor 140 may detect at least one of various features such as illuminance, intensity, color, incident direction, incident area, distribution or the like of light. According to an embodiment, the sensor 140 may be an illumination sensor, a temperature sensor, a light amount sensing layer, a camera or the like. In particular, the sensor 140 may be implemented as an illuminance sensor which detects red-green-blue (RGB) light, and may not be limited thereto. The sensor 140 may be any sensor capable of optical sensing such as a white sensor, an infrared (IR) sensor, an IR+RED sensor, a heart rate monitor (HRM) sensor, a camera, etc.

Meanwhile, at least one sensor 140 may be provided in the display apparatus 100. In case that a plurality of sensors 140 are provided in the display apparatus 100, the plurality of sensors 140 may be provided at different positions from each other as long as the sensors 140 may measure illuminances in different directions. For example, a second sensor may be provided at a position where the second sensor may detect illuminance in a different direction in which an angle thereof is different by 90° or more compared to a first sensor. For example, the sensor 140 may be disposed in a glass provided in the display panel 110.

In an embodiment, the processor 130 may adjust the current duty for each of the backlight blocks based on intensity of external light detected by the sensor 140.

In the display panel 110, gate lines GL1, GL2, . . . , and GLn and data lines DL1, DL2, DL3, DL4, . . . , DLm−2, DLm−1, and DLm may be formed to intersect with each other, and R, G and B sub-pixels PR, PG and PB may be formed in a region provided at the intersection therebetween. The R, G and B sub-pixels PR, PG and PB may be adjacent to one another and form a single pixel. That is, each pixel may include an R sub-pixel PR representing red (R), a G sub-pixel PG representing green (G) and a B sub-pixel PB representing blue (B). The each pixel may thereby reproduce a subject color in three primary colors of red (R), green (G) and blue (B).

In case that the display panel 110 is implemented as an LCD panel, each of the sub-pixels PR, PG and PB may include a pixel electrode and a common electrode. Here, light transmittance may be changed as a liquid crystal array is changed by an electric field formed by a potential difference between the two electrodes. Thin film transistors (TFTs) formed at the intersection of the gate lines GL1 to GLn between the data lines DL1 to DLm may respond to scan pulses from the gate lines GL1 to GLn, respectively. The TFTs may then supply video data from the data lines DL1 to DLm, i.e. red (R), green (G) and blue (B) data, to the pixel electrodes of the respective sub-pixels PR, PG and PB. The backlight driver 150 may be implemented to include a driver IC for driving the backlight unit 120. According to an embodiment, the driver IC may be implemented in hardware separate from the processor 130. For example, in case that the light sources included in the backlight unit 120 are implemented as LED elements, the driver IC may be implemented as at least one LED driver which controls current applied to the LED elements. According to an embodiment, the LED driver may be disposed behind a power supply (e.g. switching mode power supply (SMPS)) to receive a voltage from the power supply. However, according to an embodiment, the LED driver may receive the voltage from a separate power supply device. Alternatively, the driver IC may also be implemented as a single module in which the SMPS and LED drivers are integrated with each other.

The panel driver 160 may be implemented to include a driver IC for driving the display panel 110. According to an embodiment, the driver IC may be implemented in hardware separate from the processor 130. For example, the panel driver 160 may include a data driver 161 supplying video data to the data lines and a gate driver 162 supplying scan pulses to the gate lines.

The data driver 161 may serve to generate a data signal. That is, the data driver 161 may receive image data of a red/green/blue (R/G/B) component from the processor 130 (or a timing controller (not illustrated)) to generate the data signal. In addition, the data driver 161 may be connected to the data lines DL1 to DLm of the display panel 110 to apply a generated data signal to the display panel 110.

The gate driver 162 (or scan driver) may serve to generate a gate signal (or scan signal). The gate driver 162 may be connected to the gate lines GL1 to GLn to transmit the gate signal to a specific row of the display panel 110. The data signal output from the data driver 161 may be transmitted to a pixel to which the gate signal is transmitted.

In addition, the panel driver 160 may further include a timing controller (not illustrated). The timing controller (not illustrated) may receive the following signals from an external device, for example, the processor 130 such as an input signal IS, a horizontal sync (Hsync) signal, a vertical sync (Vsync) signal, a main clock (MCLK) signal, etc. The timing controller may then generate an image data signal, a scan control signal, a data control signal, an emission control signal and the like to provide the signals to the display panel 110, the data driver 161, the gate driver 162 and the like.

The storage 170 may store various data necessary for an operation of the display apparatus 100.

In particular, the storage 170 may store data necessary for the processor 130 to execute various processes. For example, the storage 170 may be implemented in an internal memory such as a read only memory (ROM), a random access memory (RAM) or the like, which is included in the processor 130. Alternatively, the storage 170 may be implemented in a memory separate from the processor 130. In this case, the storage 170 may be implemented in a form of a memory embedded in the display apparatus 100 or in a form of a memory attachable to and detachable from the display apparatus 100, depending on a data storing purpose. For example, data for driving the display apparatus 100 may be stored in the memory embedded in the display apparatus 100; and data for an extension function of the display apparatus 100 may be stored in the memory attachable to and detachable from the display apparatus 100. Meanwhile, the memory embedded in the display apparatus 100 may be implemented in a form such as a non-volatile memory, a volatile memory, a flash memory, a hard disc drive (HDD), a solid state drive (SDD) or the like. The memory attachable to and detachable from the display apparatus 100 may be implemented in a form such as a memory card (e.g. a micro secure digital (SD) card, a universal serial bus (USB) memory or the like), an external memory (e.g. a USB memory) connectable to a USB port or the like.

Meanwhile, according to an embodiment, the above-described information stored in the storage 170 (e.g., current adjustment curve, pixel data compensation curve, etc.) may not be stored in the storage 170, and may be obtained from an external device. For example, some information may be obtained in real time from an external device such as a set-top box, an external server, a user terminal, etc.

Figure 11:
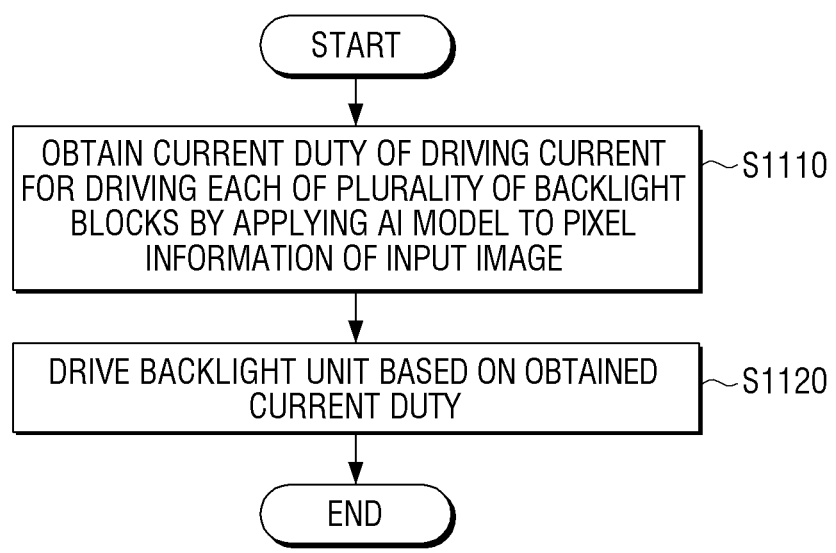
FIG. 11 is a flow chart describing a driving method of a display apparatus according to an embodiment.

FIG. 11 is a flow chart describing a driving method of a display apparatus according to an embodiment.

A driving method of a display apparatus including a backlight unit may include obtaining a current duty (S1110) of a driving current for driving each of a plurality of backlight blocks included in the backlight unit by applying an artificial intelligence (AI) model to pixel information of an input image.

The driving method may then further include driving the backlight unit (S1120) based on the obtained current duty. Here, the AI model may be a model trained based on first luminance information included in an output image corresponding to each of a plurality of sample images and second luminance information corresponding to pixel information included in each of the plurality of sample images.

Here, the output image corresponding to each of the plurality of sample images may be an output image obtained by applying backlight local dimming to each of the plurality of sample images.

In addition, the AI model may be a model trained based on the first luminance information included in the output image obtained by applying an initial AI model to each of the plurality of sample images and the second luminance information corresponding to the pixel information included in each of the plurality of sample images.

The driving method according to an embodiment may further include updating the AI model based on third luminance information included in an output image output as the backlight unit 120 is driven and fourth luminance information corresponding to pixel information included in the input image.

Here, in the updating, the AI model may be updated based on a difference value between the third luminance information and the fourth luminance information; and in the obtaining of the current duty (S1110), in case of receiving a new input image, the current duty of the driving current for driving each of the plurality of backlight blocks may be obtained by applying the updated AI model to pixel information of the received new input image.

The driving method according to an embodiment may further include predicting at least one of light diffuser information or light transmission information based on a light profile of each light source included in each of the backlight blocks to obtain the third luminance information based on the predicted information.

In addition, the second luminance information may be luminance information obtained by applying a reference current value to the pixel information included in each of the plurality of sample images.

In addition, the plurality of the sample images may be implemented in a form of at least one of a full image or a block unit image.

In addition, a display panel included in the display apparatus may be a liquid crystal panel. In addition, the AI model may be a convolution neural network (CNN) model.

Meanwhile, in the above-described embodiments, for example, it is described that the current duty for backlight dimming may be calculated in the display apparatus. However, in some embodiments, the current duty may be calculated by a separate image processing apparatus (not illustrated) without such a display panel. For example, the image processing apparatus may be implemented as one of various apparatuses which may perform image-processing such as a set-top box and a sending box that provide an image signal to the display panel.

Meanwhile, the above-described methods according to various embodiments in the disclosure may be implemented in application forms which may be installed in an existing electronic device.

In addition, the above-described methods according to the various embodiments in the disclosure may be implemented only by software upgrade or hardware upgrade of the existing electronic device.

In addition, the above-described various embodiments in the disclosure may be performed through an embedded server included in the electronic device or at least one external server of the electronic device or the display device.

According to an embodiment, the various embodiments described above may be implemented in software including an instruction stored in a machine-readable storage medium which may be read by the machine (for example, a computer). A machine may be an apparatus that invokes a stored instruction from the storage medium and may be operated following the invoked instruction, and may include the electronic device (for example, an electronic device A) according to the embodiments. In case that the instruction is performed by a processor, the processor may perform a function corresponding to the instruction directly or using other components under a control of the processor. The instruction may include codes generated or performed by a compiler or an interpreter. The machine-readable storage medium may be provided in a form of a non-transitory storage medium. Here, the term 'non-transitory' may indicate that the storage medium is tangible without including a signal, and does not distinguish whether data are semi-permanently or temporarily stored in the storage medium.

In addition, according to an embodiment, the methods according to the various embodiments described above may be included and provided in a computer program product. The computer program product may be traded as a product between a seller and a purchaser. The computer program product may be distributed in a form of a storage medium (for example, a compact disc read only memory (CD-ROM)) that may be read by the machine or online through an application store (for example, PlayStore™). In case of the online distribution, at least portions of the computer program products may be at least temporarily stored or generated in a storage medium such as a memory of a server of a manufacturer, a server of an application store or a relay server.

In addition, each of components (for example, modules or programs) according to the various embodiments described above may include a single entity or a plurality of entities, and some of the corresponding sub-components described above may be omitted or other sub-components may be further included in the various embodiments. Alternatively or additionally, some of the components (for example, the modules or the programs) may be integrated into one entity, and may perform functions performed by the respective corresponding components before being integrated in the same or similar manner. Operations performed by the modules, the programs or other components according to the various embodiments may be performed in a sequential manner, a parallel manner, an iterative manner or a heuristic manner, at least some of the operations may be performed in a different order or be omitted, or other operations may be added thereto.

Although the embodiments are illustrated and described in the disclosure as above, the disclosure is not limited to the above mentioned specific embodiments, and may be variously modified by those skilled in the art to which the disclosure pertains without departing from the gist in the disclosure. These modifications should also be understood to fall within the scope and spirit in the disclosure.

What is claimed is:

1. A display apparatus comprising:
a display panel;
a backlight unit including a plurality of backlight blocks; and
a processor configured to:
obtain a current duty of a driving current for driving each of the plurality of backlight blocks by applying an artificial intelligence (AI) model to pixel information of an input image, and
drive the backlight unit based on the obtained current duty,
wherein the AI model is trained based on first luminance information included in an output image corresponding to each of a plurality of sample images and second luminance information corresponding to pixel information included in each of the plurality of sample images.

2. The display apparatus as claimed in claim 1, wherein the output image corresponding to each of the plurality of sample images is obtained by applying backlight local dimming to each of the plurality of sample images.

3. The display apparatus as claimed in claim 1, wherein the AI model is trained based on the first luminance information included in the output image obtained by applying an initial AI model to each of the plurality of sample images and the second luminance information corresponding to the pixel information included in each of the plurality of sample images.

4. The display apparatus as claimed in claim 1, wherein the processor is further configured to update the AI model based on third luminance information included in an output image output as the backlight unit is driven and fourth luminance information corresponding to pixel information included in the input image.

5. The display apparatus as claimed in claim 4, wherein the processor is further configured to update the AI model based on a difference value between the third luminance information and the fourth luminance information, and
based on receiving a new input image, the processor is further configured to obtain the current duty of the driving current for driving each of the plurality of backlight blocks by applying the updated AI model to pixel information of the received new input image.

6. The display apparatus as claimed in claim 4, wherein the processor is further configured to predict at least one of light diffuser information or light transmission information based on a light profile of each light source included in each of the plurality of backlight blocks to obtain the third luminance information based on the predicted information.

7. The display apparatus as claimed in claim 1, wherein the second luminance information is obtained by applying a reference current value to the pixel information included in each of the plurality of sample images.

8. The display apparatus as claimed in claim 1, wherein the plurality of sample images comprises at least one of a full image or a block unit image.

9. The display apparatus as claimed in claim 1, wherein the display panel comprises a liquid crystal panel.

10. The display apparatus as claimed in claim 1, wherein the AI model comprises either a deep neural network (DNN) model configured to obtain a representative output value of each of the plurality of backlight blocks using dimensionality reduction on the input image or a combination of a plurality of DNN models.

11. A driving method of a display apparatus including a backlight unit, the driving method comprising:
obtaining a current duty of a driving current for driving each of a plurality of backlight blocks included in the backlight unit by applying an artificial intelligence (AI) model to pixel information of an input image; and
driving the backlight unit based on the obtained current duty,
wherein the AI model is trained based on first luminance information included in an output image corresponding to each of a plurality of sample images and second luminance information corresponding to pixel information included in each of the plurality of sample images.

12. The driving method as claimed in claim 11, wherein the output image corresponding to each of the plurality of sample images is obtained by applying backlight local dimming to each of the plurality of sample images.

13. The driving method as claimed in claim 11, wherein the AI model is trained based on the first luminance information included in the output image obtained by applying an initial AI model to each of the plurality of sample images and the second luminance information corresponding to the pixel information included in each of the plurality of sample images.

14. The driving method as claimed in claim 11, further comprising:
updating the AI model based on third luminance information included in an output image output as the backlight unit is driven and fourth luminance information corresponding to pixel information included in the input image.

15. The driving method as claimed in claim 14, wherein the updating the AI model further comprises updating the AI model based on a difference value between the third luminance information and the fourth luminance information, and
the obtaining the current duty further comprises, based on receiving a new input image, obtaining the current duty of the driving current for driving each of the plurality of backlight blocks by applying the updated AI model to pixel information of the received new input image.

16. The driving method as claimed in claim 14, further comprising:
predicting at least one of light diffuser information or light transmission information based on a light profile of each light source included in each of the plurality of backlight blocks to obtain the third luminance information based on the predicted information.

17. The driving method as claimed in claim 11, wherein the second luminance information is obtained by applying a reference current value to the pixel information included in each of the plurality of sample images.

18. The driving method as claimed in claim 11, wherein the plurality of sample images comprises at least one of a full image or a block unit image.

19. The driving method as claimed in claim 11, wherein a display panel included in the display apparatus comprises a liquid crystal panel.

20. The driving method as claimed in claim 11, wherein the AI model comprises either a deep neural network (DNN) model obtaining a representative output value of each of the plurality of backlight blocks using dimensionality reduction on the input image or a combination of a plurality of DNN models.

* * * * *